US008373579B2

(12) United States Patent
Naimer et al.

(10) Patent No.: US 8,373,579 B2
(45) Date of Patent: Feb. 12, 2013

(54) AIRCRAFT GROUND MANEUVERING MONITORING SYSTEM

(75) Inventors: Joachim Laurenz Naimer, Ascona (CH); Frank Hummel, Woodinville, WA (US); John Jorgensen, Kirkland, WA (US); Patrick Krohn, Bellevue, WA (US)

(73) Assignee: Universal Avionics Systems Corporation, Tucson, AZ (US)

( * ) Notice: Subject to any disclaimer, the term of this patent is extended or adjusted under 35 U.S.C. 154(b) by 1467 days.

(21) Appl. No.: 11/634,663

(22) Filed: Dec. 6, 2006

(65) Prior Publication Data

US 2008/0140269 A1    Jun. 12, 2008

(51) Int. Cl.
*G08B 21/00*    (2006.01)

(52) U.S. Cl. .......................................... 340/945; 701/10

(58) Field of Classification Search .................. 340/945, 340/995, 500; 701/10, 120, 122
See application file for complete search history.

(56) References Cited

U.S. PATENT DOCUMENTS

| | | | |
|---|---|---|---|
| 3,896,432 A * | 7/1975 | Young .............................. | 342/33 |
| 5,200,902 A | 4/1993 | Pilley | |
| 5,740,047 A | 4/1998 | Pilley et al. | |
| 6,219,618 B1 | 4/2001 | Bateman | |
| 6,538,581 B2 | 3/2003 | Cowie | |
| 6,591,170 B2 * | 7/2003 | Block et al. ........................ | 701/9 |
| 6,606,563 B2 * | 8/2003 | Corcoran, III ................. | 701/301 |
| 6,983,206 B2 | 1/2006 | Conner et al. | |
| 7,109,889 B2 * | 9/2006 | He ................................. | 340/971 |
| 7,117,089 B2 * | 10/2006 | Khatwa et al. ................. | 701/301 |
| 7,206,698 B2 | 4/2007 | Conner et al. | |
| 2003/0107499 A1 * | 6/2003 | Lepere et al. ................. | 340/945 |
| 2003/0160708 A1 * | 8/2003 | Knoop ........................... | 340/958 |
| 2004/0006412 A1 * | 1/2004 | Doose et al. .................... | 701/10 |
| 2004/0030465 A1 * | 2/2004 | Conner et al. .................. | 701/16 |
| 2004/0181318 A1 * | 9/2004 | Redmond et al. ................. | 701/9 |
| 2005/0015202 A1 | 1/2005 | Poe et al. | |
| 2005/0128129 A1 | 6/2005 | Conner et al. | |
| 2005/0151681 A1 | 7/2005 | Conner et al. | |
| 2005/0192738 A1 | 9/2005 | Conner et al. | |

FOREIGN PATENT DOCUMENTS

| | | |
|---|---|---|
| EP | 0744630 A2 | 11/1996 |
| EP | 0756153 A2 | 1/1997 |
| WO | WO 97/47946 | 1/1997 |
| WO | WO 00/16230 | 3/2000 |
| WO | WO 00/57202 | 9/2000 |

\* cited by examiner

*Primary Examiner* — George Bugg
*Assistant Examiner* — Edny Labbees
(74) *Attorney, Agent, or Firm* — Quarles & Brady, LLP; George E. Haas

(57) ABSTRACT

A monitoring system for alerting pilots of aircraft or operators of vehicles when the aircraft or vehicle is approaching a geographical feature of interest, such as a runway, includes a database including at least one geo-referenced chart; a processor; a positioning system configured to identify at least one of the position, heading, track and velocity of the vehicle, and transmit such data to the processor; and a display unit configured to display the present position of the aircraft on the at least one geo-referenced chart. After receiving the position, heading, track and/or velocity data, the processor determines whether the aircraft has entered a containment area associated with a geographical feature of interest, and if so, provides a visible notification to the pilot or operator, which may comprise a change in display of the geographical feature of interest.

2 Claims, 5 Drawing Sheets

AIRCRAFT GROUND MANEUVERING MONITORING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates to a system for alerting operators of aircraft during ground operations that the aircraft is approaching a runway or other designated area.

2. The Prior Art

Within the aviation industry, a serious concern exists regarding the unauthorized entry of aircraft onto airport runways during taxiing operations, which is commonly referred to as a "runway incursion". This concern has recently been heightened by a number of recent incidents involving "near-misses" occurring when two aircraft have attempted to use the same runway or intersecting runways at the same time, resulting in the potential for a disastrous collision. In another recent incident, a commercial aircraft crashed during takeoff, due to the fact that the pilot had attempted to take off from the wrong runway, which was shorter than the minimum required take-off distance for the aircraft.

Various systems have been used in the past in order to minimize the potential for runway incursions. A number of "traditional" systems are described in U.S. Pat. No. 6,606,563, which have primarily relied on the pilot and/or air traffic controller to monitor the position of the aircraft relative to airport runways during taxiing operations. These systems have included requiring a pilot to request permission from an air traffic controller before taxiing across a runway, relying on air traffic controllers to visually monitor the movement of aircraft while taxiing, and placing signs and markings on the ground to indicate the position of an aircraft relative to a given runway. However, such systems are not well suited to prevent runway incursions at many of today's larger airports, which include many runways and taxiways where dozens of aircraft may be taxiing, taking off or landing at any given time. Moreover, such systems are less reliable at night or during low-visibility conditions, when the ability of pilots and air traffic controllers to monitor conditions visually is diminished.

U.S. Pat. No. 6,606,563 discloses a system for alerting an operator of a vehicle, such as an aircraft, that the vehicle is approaching or within a zone of awareness, such as a runway. The system includes an electronic database which stores the location of the zone of awareness, a positioning system (e.g., GPS) which determines the location of the aircraft, a processor which calculates the distance between the vehicle location and the zone of awareness, and an alarm that alerts the pilot when the distance is less than a predetermined value. All of these components are located on the aircraft itself, so that the system need not rely on input from outside sources, for example air traffic control systems, in order to warn the pilot of a potential runway incursion.

The storage device of this system comprises a conventional computer memory device (e.g., RAM, CD-ROM, EPROM), in which is stored a database including location information for any desired number of zones of awareness. The zones of awareness may include all or part of a runway, and may additionally include any other area for which an alert would be desirable if approached by an aircraft (e.g., construction zone). The coordinates for each zone of awareness may be determined relative to the surface of the earth, e.g., longitude and latitude.

The alarm function is disclosed as including either audible and/or visual components. The audible alarm may include a synthesized voice warning identifying the name of the runway (e.g., "ENTERING RUNWAY 27") and/or the location of the aircraft relative to the runway (e.g., "RUNWAY AHEAD"). The visual component of the alarm may include a designation of a feature within the zone of awareness, such as the word "RUNWAY" displayed on a screen, an identification of a specific runway (e.g., "RUNWAY 27") on a screen, and/or other information such as a map of the airport showing the location of various geographical features.

While the alerting system disclosed by U.S. Pat. No. 6,606,563 provides pilots with some notification of potential runway incursions, as described above, that system does not teach the use of a conventional electronic airport chart to display a graphical depiction of the present position of an aircraft, relative to the runway of interest and other geographical features of the airport. Thus, while the pilot may understand that he is approaching a runway, he may not immediately realize where the runway is located relative to his aircraft or which way he should proceed to avoid entering the runway—particularly if he is operating at an airport with which he is unfamiliar. Moreover, if the pilot has entered a runway different from the runway on which the aircraft has been cleared to take off, he may not be cognizant of that fact based solely on an audible warning or a visual designation such as "RUNWAY" appearing on a display screen. Accordingly, it would be desirable to combine a warning that the aircraft is approaching a runway, with a visual notification to the pilot identifying precisely where the aircraft is located relative to various geographical features within the airport, at the time of the notification.

Systems for displaying the position of an aircraft on a display device relative to geographical features at an airport, such as runways, taxiways, terminals, etc., are known in the art. Electronic airport charts, such as those provided by Jeppesen Sanderson, Inc. ("Jeppesen") in association with its JeppView software, are routinely utilized by pilots to obtain a graphical depiction of the position of an aircraft relative to other geographical features of an airport.

Electronic airport charts are typically stored in a computerized database, which is either located on a hard disk drive or a CD-ROM drive connected to an onboard computer system. One such system is the Application Server Unit (ASU) offered by Universal Avionics Systems Corporation ("Universal Avionics"). The computer system typically includes a display unit on which the airport charts are displayed, which may comprise either a panel-mounted display unit, such the EFI-890R diagonal flat screen display unit from Universal Avionics, or a portable, standalone display unit, such as the Universal Cockpit Display Terminal (UCDT) from Universal Avionics. Typically, such systems are able to utilize avionics data obtained from the aircraft's flight management system (FMS), including position, heading, track and velocity data, to provide a graphical depiction of the aircraft's present position and heading on the airport chart display.

Alternatively, the database may comprise part of a portable, standalone computer system, such as an electronic flight bag (EFB) system, which may or may not be integrated with the aircraft's avionics systems. One such EFB system is the Universal Cockpit Display (UCD) system, from Universal Avionics, which comprises a Universal Cockpit Display Computer and one or more UCDT display units. Such a system can provide the flight crew with a variety of information such as checklists, airport and aeronautical charts, external video displays, electronic documents and weather data. However, EFB systems, and particularly those systems which are not capable of receiving data from the aircraft's avionics systems, have limited capability of notifying the flight crew of potential runway incursions, as they typically have limited or no capability of obtaining data regarding the aircraft's position and velocity, for display on an airport charts stored within the database.

Standard airport charts, while useful for providing general position information, were previously limited by the fact that positional coordinates on the charts were not indexed to a fixed global reference frame, such as the WGS 84, which is the reference system used by the Global Positioning System (GPS). As a result, such charts were likely to generate significant error between the actual position of the aircraft relative to airport geographical features, as determined by GPS, and the aircraft position displayed on the airport chart, because the positional coordinates on those charts were not based on WGS 84. The difference between the true position of the aircraft and the position displayed on a standard electronic airport chart could potentially total tens or hundreds of meters. Thus, such charts were simply not capable of displaying the position of an aircraft with sufficient accuracy to identify potential runway incursions.

In recent years, providers of airport charts, such as Jeppesen, have solved this problem by providing "geo-referenced" airport charts, in which each coordinate on the chart is indexed to a particular geographical location having a specific latitude and longitude, as determined relative to a fixed global reference frame such as the WGS 84. As a result, a position of an aircraft determined using GPS can be displayed on a geo-referenced airport chart with an accuracy unobtainable using standard, non-geo-referenced airport charts.

However, in order to realize the significant advantages afforded by the use of geo-referenced airport charts, it is important that the system include some method for monitoring and identifying inconsistencies between the source data (which includes both the stored airport geographical feature data as well as dynamic aircraft position and orientation data) and the graphical presentation of that data on the aircraft display device. Without providing such a monitoring feature in association with the use of geo-referenced airport charts, the runway, taxiway, aircraft position or other airport element could be incorrectly drawn on the display, without the pilot being aware of such an error. This could result in either a false notifications of a potential runway incursion, or a failure to notify the pilot of an actual potential runway incursion.

Another system for alerting pilots of potential runway incursions is the surface area movement management (SAMM) software system provided by Aviation Communication & Surveillance Systems (ACSS). The SAMM system provides pilots with warnings of potential runway incursions, by monitoring position signals received from other aircraft engaging in taxiing, takeoff or landing operations at the same airport, such as ADS-B transmissions and mode-S transponders. Based on such information, the SAMM system can provide pilots with a warning if another aircraft enters the same runway during a takeoff operation. For example, is an airplane equipped with SAMM were to start its takeoff roll just as another aircraft equipped with ADS-B or a mode-S transponder taxied onto the active runway, the cockpit display in the SAMM-equipped aircraft would immediately draw a red box around the active runway, highlight the threat aircraft in red, and provide an aural alert.

However, while the SAMM system is capable of warning a pilot of potential incursions by other aircraft onto a runway being used by his aircraft, and highlighting the position of both aircraft on an electronic airport chart, it does not provide the pilot with any notification prior to his own aircraft entering onto the runway in the first place. Thus, a pilot who has entered the wrong runway prior to takeoff would not be provided with a notification of which runway the aircraft has entered, prior to his attempting to take off.

While systems such as those disclosed above are capable of alerting pilots with to potential runway incursions under certain circumstances, they each have significant limitations. Thus, it would desirable to provide a system for notifying a pilot that his aircraft is approaching a runway or other geographical feature of interest, while simultaneously identifying the position of the aircraft relative to a geo-referenced airport chart. This would ensure that the pilot was not only made aware that his aircraft would enter a runway if it continues on its current path, but also enable the pilot to immediately assess the location of his aircraft relative to other airport features. This would likewise minimize the possibility of a pilot attempting to take off from the wrong runway, by enabling the pilot to visually confirm from the airport chart display that the aircraft is indeed on the correct runway—particularly at night or during periods of low visibility when runway markings, lights, etc. may be insufficient for that purpose.

It would likewise be desirable to provide a method of notifying a pilot that his aircraft is approaching a runway or other feature of interest, in which the notification includes both a visual notification associated with a geo-referenced airport chart, and an audible notification identifying the runway or feature of interest.

It would further be desirable to provide such a method which further includes monitoring and notifying the pilot of any errors or inconsistencies between source data (either stored airport data or dynamic aircraft position/orientation data) and the graphical presentation of that data on an aircraft display device.

SUMMARY OF THE INVENTION

In one embodiment, the invention comprises a monitoring system for notifying a pilot that an aircraft is approaching a geographical feature of interest, such as a runway. The monitoring system of the invention includes a database including geo-referenced airport chart data; a processor; a positioning system configured to identify at least one of the position, heading, track and velocity of the aircraft, and transmit data corresponding to at least one of the position, heading, track and velocity to the processor; and a display unit configured to display the geo-referenced airport chart and to display the present position of the aircraft on the geo-referenced airport chart.

The processor receives the position, heading, track and/or velocity data from the positioning system, and then determines whether the aircraft has entered a containment area associated with the geo-referenced airport chart. Upon entry of the aircraft into a containment area, the processor initiates a notification signal to the display unit, causing a visible notification to be displayed on the display unit. The visible notification may comprise a change in display of a geographical feature on the geo-referenced airport chart, such as a runway. The visible notification may also comprise an identification of a geographical feature corresponding to the containment area.

In another embodiment, the invention comprises a monitoring system for notifying an operator of a vehicle that the vehicle is approaching a geographical area of interest. The monitoring system of the invention includes a database including geo-referenced airport chart data; a processor; a positioning system configured to identify at least one of the position, heading and velocity of the vehicle, and transmit data corresponding to at least one of the position, heading and velocity of the vehicle to the processor; and a display unit configured to display the geo-referenced chart and to display the present position of the vehicle on the geo-referenced chart.

The processor receives the position, heading and/or velocity data from the positioning system, and then determines whether the vehicle has entered a containment area associated with the geo-referenced chart. Upon entry of the vehicle into a containment area, the processor initiates a notification signal to the display unit, causing a visible notification to be displayed on the display unit. The visible notification may comprise a change in display of a geographical feature on the geo-referenced chart. The visible notification may also comprise an identification of a geographical feature corresponding to the containment area.

The monitoring system also preferably comprises a means for generating an audible notification. Upon entry of the aircraft or vehicle into a containment area, the processor initiates a notification signal to the audible notification means, causing an audible notification to be generated. The monitoring system preferably also comprises an input means configured to permit the pilot or operator of the vehicle to temporarily disable the visible and/or audible notifications while the aircraft or vehicle is within the containment area. The visible and/or audible notification preferably ceases upon the aircraft or vehicle leaving the containment area.

In another embodiment, the invention comprises a method for notifying a pilot of an aircraft that the aircraft is approaching a geographical feature of interest, such as a runway. The method includes retrieving geo-referenced airport chart data and containment area data from a database; displaying the geo-referenced airport chart on a display unit; determining at least one of the position, heading, track and velocity of the aircraft; transmitting data corresponding to at least one of the position, heading, track and velocity of the aircraft to a processor; displaying visual indicia corresponding to least one of the position, heading, track and velocity of the aircraft overlaid on the geo-referenced airport chart; determining whether the aircraft has entered the containment area; and upon determining that the aircraft has entered the containment area, providing a visible notification to the pilot.

The visible notification may comprise a change in display of a geographical feature on the geo-referenced airport chart, such as a runway. The visible notification may also comprise an identification of a geographical feature corresponding to the containment area. The pilot is preferably permitted to temporarily disable the visible notification while the aircraft is within the containment area. The visible notification preferably ceases upon the aircraft leaving the containment area. The method may also include providing an audible notification to the pilot upon the aircraft entering the containment area.

The invention preferably also includes comparing the airport chart display and aircraft display with the airport chart data and aircraft position data, and providing a notification to the pilot in the event that a display error is detected.

In yet another embodiment, the invention comprises a method for notifying an operator of a vehicle that the vehicle is approaching a geographical feature of interest. The method includes retrieving geo-referenced chart data and containment area data from a database; displaying the geo-referenced chart on a display unit; determining at least one of the position, heading and velocity of the vehicle; transmitting data corresponding to at least one of the position, heading and velocity of the vehicle to a processor; displaying visual indicia corresponding to least one of the position, heading and velocity of the vehicle overlaid on the geo-referenced chart; determining whether the vehicle has entered the containment area; and upon determining that the vehicle has entered the containment area, providing a visible notification to the operator.

The visible notification may comprise a change in display of a geographical feature on the geo-referenced chart, or an identification of a geographical feature corresponding to the containment area. The operator is preferably permitted to temporarily disable the visible notification while the vehicle is within the containment area. The visible notification preferably ceases upon the vehicle leaving the containment area. The method may also include providing an audible notification to the operator upon the vehicle entering the containment area.

The invention preferably also includes comparing the chart display and vehicle display with the chart data and vehicle position data, and providing a notification to the operator in the event that a display error is detected.

DETAILED DESCRIPTION OF THE INVENTION

Figure 1:
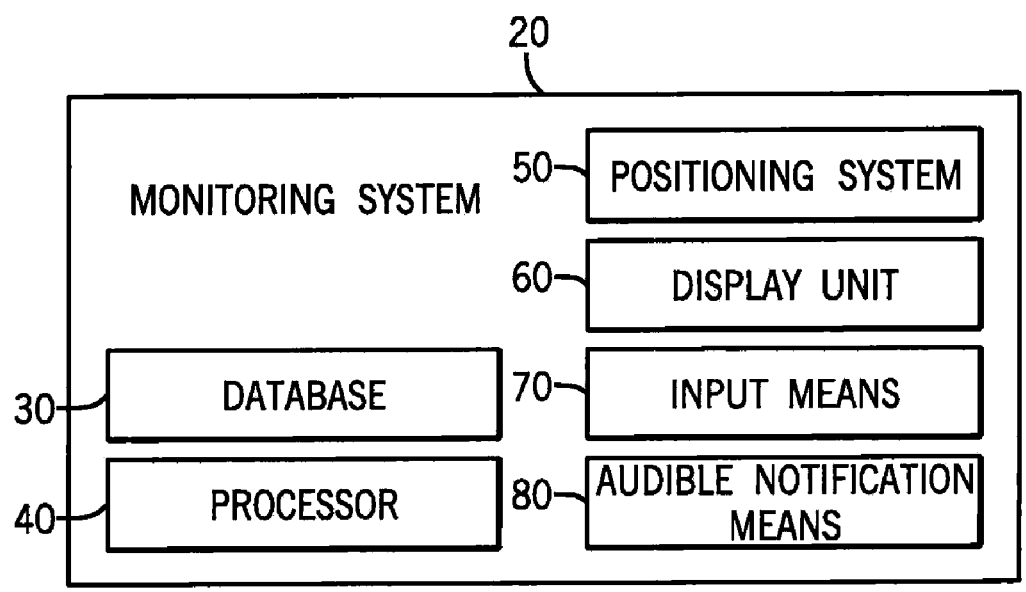
FIG. 1 is a block diagram illustrating the components of a preferred embodiment of the aircraft ground maneuvering monitoring system of the invention.

While this invention is susceptible of embodiment in many different forms, there is shown in the drawings and will herein be described in detail, several preferred embodiments, with the understanding that the present disclosure should be considered as an exemplification of the principles of the invention and is not intended to limit the invention to the embodiments so illustrated.

While the term "pilot" is used hereinbelow for the sake of simplicity, it should be understood that, in the context of the invention, "pilot" refers to any member of an aircraft flight crew capable of receiving notifications regarding the state of the aircraft.

Aircraft ground maneuvering monitoring system 20 is shown in FIG. 1 as generally comprising database 30, processor 40, positioning system 50, display unit 60, input means 70 and audible notification means 80. Some or all components of monitoring system 20 may be included within existing computer systems previously installed on an aircraft and integrated with the aircraft's avionics systems, such as the Application Server Unit from Universal Avionics Systems Corporation ("Universal Avionics"). Alternatively, monitoring system 20 may comprise a standalone unit, such as an electronic flight bag (EFB) unit, which is fully portable, but is capable of obtaining avionics data from the aircraft's flight management system (FMS).

Figure 2:
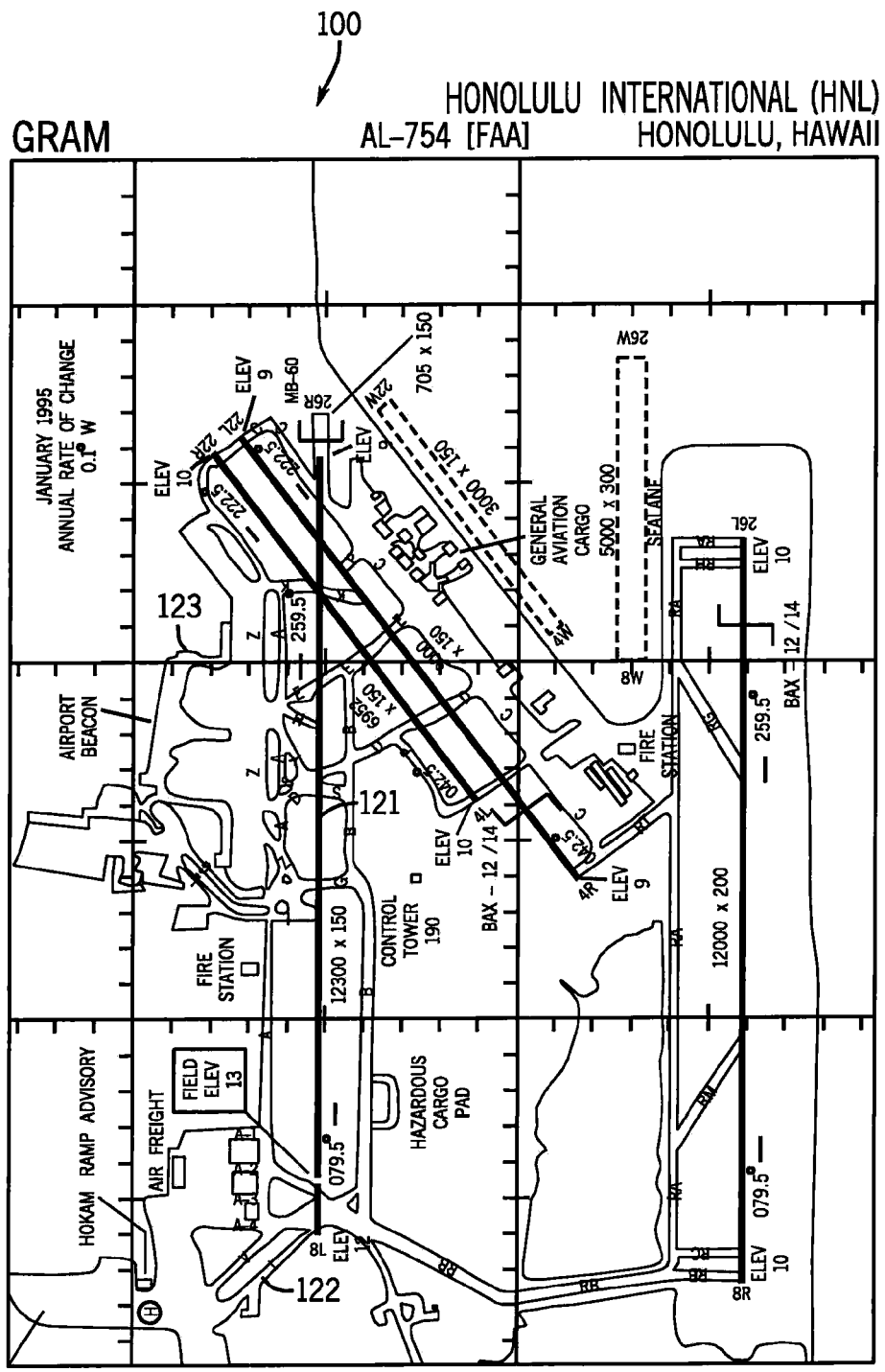
FIG. 2 is a representation of a conventional airport chart, indicating the positioning of runways, taxiways, terminals and other geographical features.

Database 30 is comprised of a conventional computer data storage component, such as solid-state random access memory (RAM), CD-ROM, hard disk drive, or the like. Database 30 is used to store chart data for electronic airport charts, such as those provided within Jeppesen's JeppView software program. A conventional electronic airport chart 120 is shown in FIG. 2, as including runway 121, taxiway 122, and terminal 123, among other features. The electronic airport charts contained within database 30 are preferably geo-referenced, as described above. Database 30 further includes data identifying one or more containment areas 124 associated with each airport chart, which are further described below with reference to FIGS. 3 and 4.

Processor 40 comprises a conventional computer processing component capable of performing mathematical operations and manipulating data, such as the Pentium® series of processors from Intel, Inc.

Positioning system 50 preferably comprises a conventional flight management system (FMS), which utilizes global positioning system (GPS) and inertial reference system (IRS) data, to instantaneously determine the location (latitude and longitude), heading, track and velocity of the aircraft. Such flight management systems are well known in the art. Positioning system 50 may likewise comprise any other system(s) known in the art for determining the position, heading, track and velocity of an aircraft, and may further utilize an augmentation system, such as a wide area augmentation system (WAAS), in order to determine the position of the aircraft with increased accuracy.

Display unit 60 preferably comprises a conventional computer display unit, such as a cathode ray tube (CRT) or a liquid crystal display (LCD). Examples of display units which are well suited for use in monitoring system 20 include panel-mounted display units, such the EFI-890R diagonal flat screen display unit from Universal Avionics, and portable, standalone display units, such as the UCDT from Universal Avionics.

Input means 70 may comprise any conventional computer input device, such as a keyboard, mouse, voice recognition unit, touch screen, or any combination of the above.

Audible notification means 80 may comprise any conventional means of providing a audible notification or warning, including a speaker, bell, buzzer, horn, or other sound-producing device. The notification provided by audible notification means 80 may take the form of any conventional alarm tone, or alternatively may produce a synthesized voice warning. In the latter case, the notification may include an identification of a feature located within the containment area being approached by the aircraft, for example, "APPROACHING RUNWAY 27".

The operation of monitoring system 20 is illustrated by reference to FIGS. 3, 4 and 5. As shown in FIG. 5, monitoring system 20 first retrieves the relevant geo-referenced airport chart from database 30, together with data which identifies the location of one or more containment areas on the chart. The geo-referenced airport chart is then displayed on display unit 60, together with a pictorial representation of the aircraft which identifies the location of the aircraft relative to other geographical features.

Figure 3:
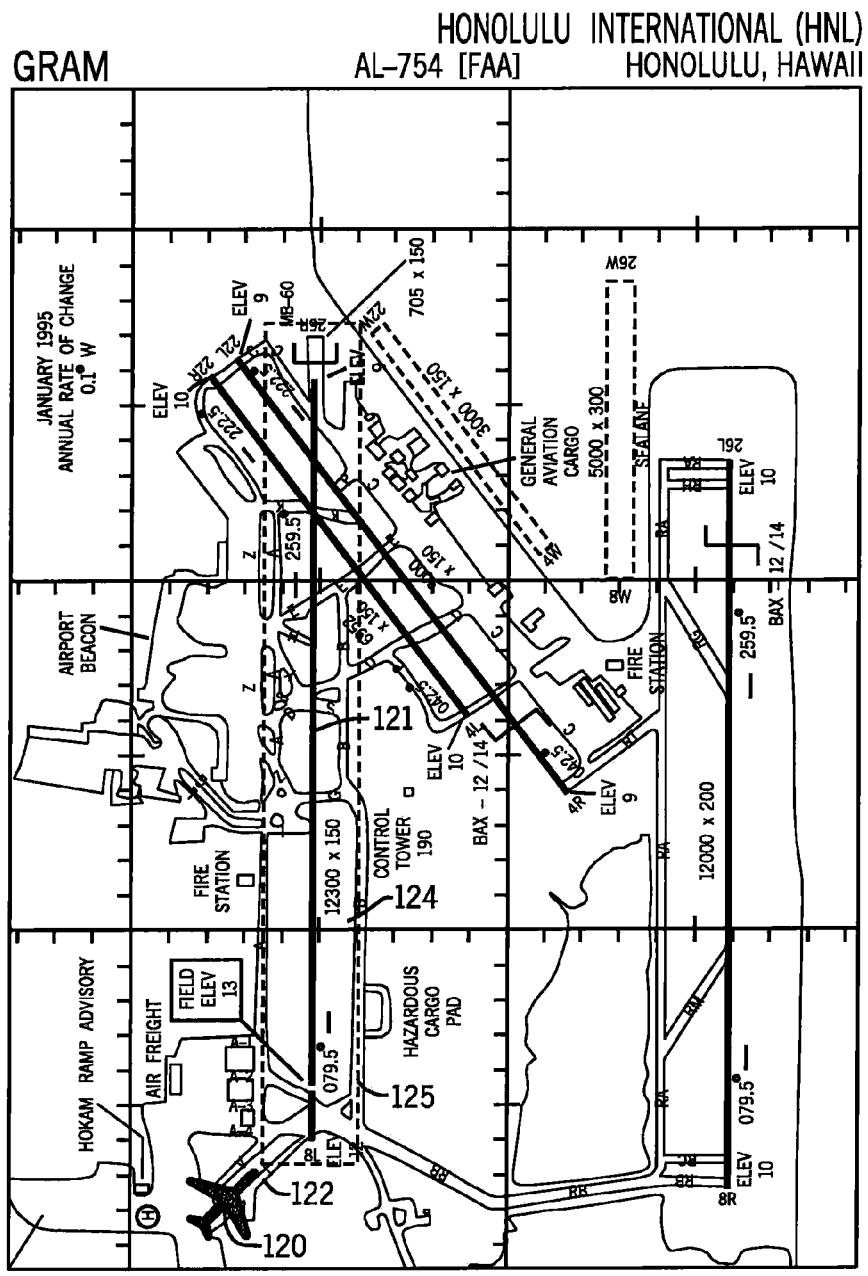
FIG. 3 is the airport chart of FIG. 2, showing the position of an aircraft during a taxiing operation.

In FIG. 3, a pictorial representation of aircraft 120 is shown on geo-referenced airport chart 100, as being located on taxiway 122, heading toward runway 121 (designated on airport chart 100 as runway 8L). Aircraft 120 is shown at a much larger scale than runway 121 and taxiway 122, in order to enhance the pilot's ability to ascertain the position of aircraft 120 (which is in reality smaller than the width of either runway 121 or taxiway 122) relative to the various geographical features of the airport, such as runway 121 and taxiway 122.

Because database 30 contains geo-referenced airport chart data, both the airport data and the aircraft position data utilize the same datum (e.g., WGS 84). The airport data and aircraft position data are processed by processor 40 to create a geo-referenced graphical presentation of airport chart 100. It is desirable to continually monitor the integrity of the graphical display, to ensure that the airport and aircraft position are accurately displayed in the correct geo-referenced location and orientation relative to each other.

As shown in FIG. 5, processor 40 is preferably programmed to monitor and identify any errors or inconsistencies between the source data (including airport geographical feature data stored in database 30 and dynamic aircraft position and orientation data obtained from positioning system 50) and the graphical presentation of that data on display unit 60. Before a graphical element (e.g., a runway or an aircraft) is presented on the display, this algorithm verifies that the element's location and orientation have been computed properly, and that the element has been drawn in the proper location and orientation on the display screen relative to other elements. Such a monitoring functionality is provided in the Universal Cockpit Display (UCD) and Application Server Unit (ASU) products which are currently available from Universal Avionics.

Errors or inconsistencies between the position of the graphical elements drawn on the display screen and the actual position of those elements as identified from the underlying source data can potentially arise due to, for example, errors in the underlying source data itself (e.g., the database identifies the position of a runway in the wrong location) or incompatibility between the graphics software used to draw the elements and the display unit hardware 60. If processor 40 identifies any such errors, a notification is preferably provided to the pilot.

For example, if the airport chart data cannot be properly computed by processor 40, airport chart 100 will not be displayed on display unit 60, and the notification may comprise an error message displayed on display unit 60. If an error is detected in association with the display of a single graphical element, such as the position of runway 121, the notification may comprise displaying that graphical element on display unit 60 in another color (e.g., yellow), to notify the pilot that the position of the potential error between the displayed position of the aircraft and that of the displayed graphical element.

Also shown in FIG. 3 is containment area 124, which may also be displayed on airport chart 100, if desired, although the invention does not require that a pictorial representation of containment area 124 itself be displayed. Containment area 124 may comprise a fixed area surrounding a runway or other desired geographical feature, and is bounded by boundary 125. For example, containment area 124 may simply comprise a rectangular area which extends a specified distance (e.g., 100 meters) beyond the end and side boundaries of the runway, as shown in FIG. 3. Alternatively, containment area may comprise any other desired fixed area(s). For instance, smaller, individual containment areas may be located at each intersection between a runway and a taxiway, or a containment area may extend along portions or the entirety of both a runway and a taxiway.

Of course, containment area 124 is not to be limited to a rectangular configuration, and may take any desired size or shape, depending on the specific geographical feature for which a notification is desired, such as a construction area or military area, to name but a few.

Alternatively, the configuration of containment area 124 may vary depending on the instantaneous velocity of aircraft 120. This would enable monitoring system 20 to provide a notification of a potential runway incursion at least a certain amount of time before aircraft 120 would reach runway 121 at its present velocity. In such a configuration, the size of the containment area will increase as the velocity of the aircraft increases, to assure that the notification is provided to the pilot in sufficient time for the pilot to change course or stop the aircraft to avoid a runway incursion, if necessary. One such configuration may comprise a rectangular area which extends beyond the boundaries of runway 121 by a distance equal to v*t, where v is the instantaneous velocity of aircraft 120 and t is the desired period of time which aircraft 100 would require to reach the entrance to runway 121 at that velocity. For example, if the desired period of time is 15 seconds, and aircraft 120 is taxiing at a speed of 30 knots (15 m/s), processor 40 would calculate containment area 124 at that instant as extending 450 meters beyond the boundaries of runway 121. As processor 40 continuously receives instantaneous velocity data from positioning system 50, the size of containment area 124 would increase or decrease, as the velocity of aircraft 100 increases or decreases.

As yet another alternative, containment area 124 may vary according to the velocity of the aircraft, as described above, relative to a second, smaller area which extends beyond the boundaries of the runway itself. This embodiment would ensure that, even if the aircraft were traveling very slowly, the pilot would receive notification some distance prior to entering the runway. In such an embodiment, at any given instant containment area 124 would extend beyond the boundaries of runway 121 by a distance equal to x+(v*t), where x equals the minimal distance from the runway at which a notification would be provided. Of course, modifications to the method of determining the size of the containment area which would enable the determination of a containment area having any desired, non-rectangular shape, based in whole or in part on the velocity of the aircraft, would be readily apparent to one of skill in the art.

As aircraft 120 approaches runway 121, positioning system 50 continually monitors the instantaneous position, heading, track and/or velocity of aircraft 120, and communicates that data to processor 40. Based on the position, heading, track, and/or velocity data, processor 40 continuously evaluates whether aircraft 120 has entered containment area 124. Depending on the desired method of determining the size of the containment area (as discussed above), any combination of the position, heading, track and/or velocity data may be utilized by processor 40 in determining whether aircraft 120 has entered a containment area 124. Prior to entry of aircraft 120 into containment area 124, monitoring system 20 can be thought of as in a "standby mode", in which monitoring system 20 is continuously monitoring the position of aircraft 120 relative to containment area 124, but has yet to generate any notification to the pilot.

Figure 4:
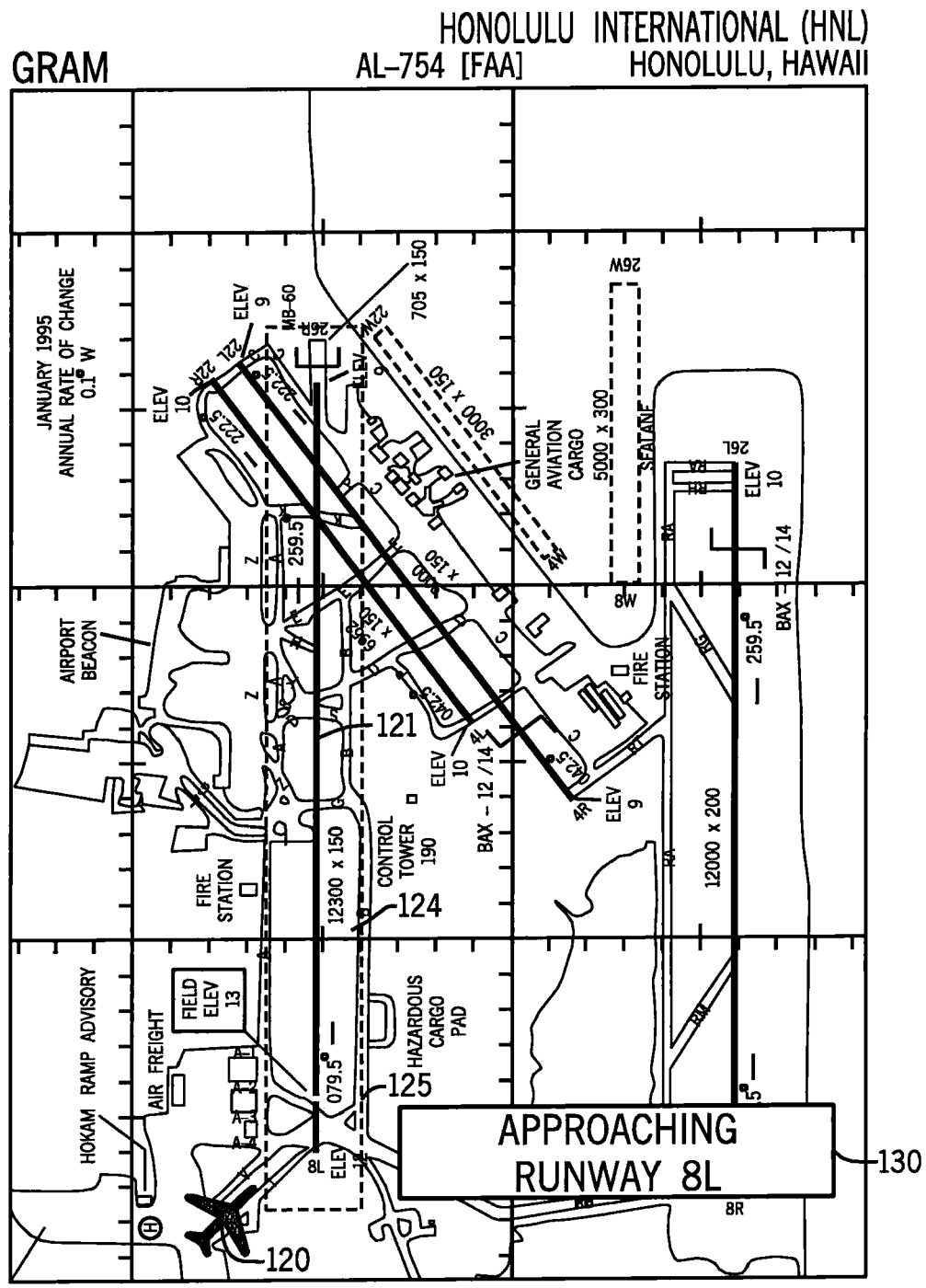
FIG. 4 is the airport chart of FIG. 3, in which the aircraft has entered a containment area surrounding a runway.
Figure 5:
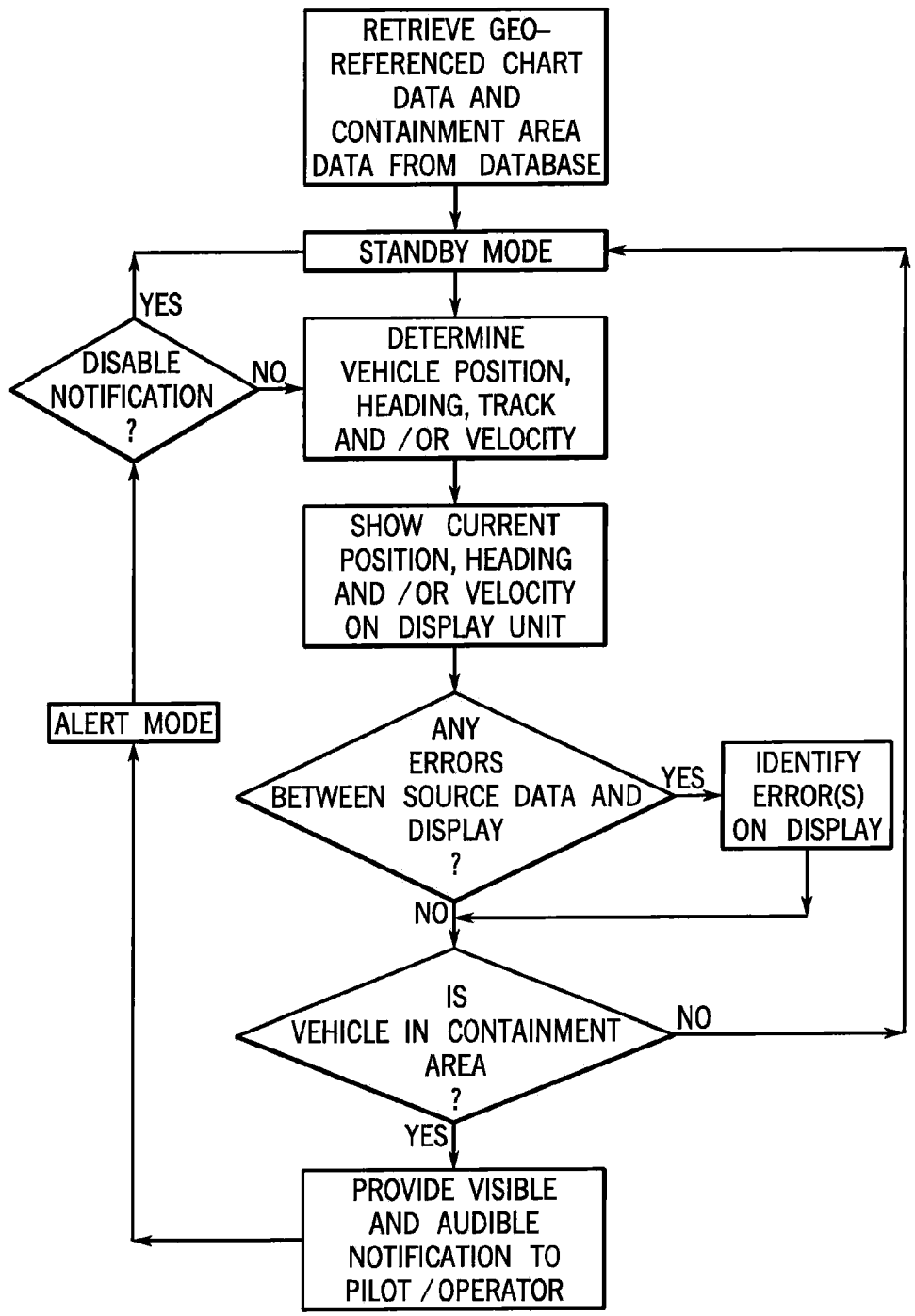
FIG. 5 is a flowchart illustrating features of a method according to the invention.

When, as shown in FIG. 4, aircraft 120 has reached boundary 125 of containment area 124, processor 40 initiates a notification signal to display unit 60, to provide a visible notification to the pilot that aircraft 120 has entered containment area 124. At this point, monitoring system 20 has entered an "alert mode", in which monitoring system 20 continues to provide a visible notification to display unit 60, until aircraft 120 either exits containment area 124, thereby returning the system to standby mode, or the pilot disables the visible notification (as described below).

The visible notification may consist of a change in the way runway 121 is displayed on geo-referenced airport chart 100, such as changing the color of runway 121 to a color which differs from other features shown on airport chart 100 (e.g., from black to red), causing runway 121 to flash, or a combination of the two. Alternatively, or in addition to the change in the display of runway 121, the visible notification may include other changes to the display of airport chart 100, such as changing the color of the chart background, causing a textual warning 130 identifying the geographic feature associated with containment area 124 (e.g., "APPROACHING RUNWAY 8L") to appear and/or flash on a certain portion of display unit 60, changing the color of aircraft 120, causing aircraft 120 to flash, or a combination of any or all of the above.

In addition to generating a visible notification, upon entering this "alert mode" monitoring system 20 may also initiate a notification signal to audible notification means 80 to generate an audible notification to the pilot, as described above.

After monitoring system 20 has entered the "alert mode", the pilot of aircraft 120 may be permitted to disable either or both of the visible and/or audible notifications, by way of input means 70. Such a feature is particularly desirable where monitoring system 20 includes an repeated or continuous audible notification, which is no longer necessary once the pilot has been notified that aircraft 120 is approaching runway 121. Where input means 70 comprises a touch screen, such as with the Universal Avionics UCDT, there may be provided a location on the touch screen which disables the visible and/or audible notifications when touched. Alternatively, where input means 70 comprises a keyboard, any desired keystroke (e.g., space bar, ESC key, etc.) or combination of keystrokes may disable the visible and/or audible notifications. This feature may be configured so that the pilot may disable the audible notification, but not the visible notification, or vice versa.

Preferably, when a pilot disables the visible and/or audible notifications, those notifications are disabled only with respect to the containment area in which the aircraft is presently located. In that case, monitoring system 20 will return to "standby mode" upon disabling of the visible and/or audible notifications by the pilot, and will once again provide a notification if aircraft 120 leaves and reenters containment area 124, or enters a different containment area identified in database 30. Likewise, processor 40 will be programmed so that monitoring system 20 will return to "standby mode" once aircraft 120 exits containment area 124, and will once again provide a notification if aircraft 120 reenters containment area 124 or enters a different containment area.

While the embodiments of the invention described herein relate to a system for alerting a pilot to potential runway incursions while engaged in taxiing operations at an airport, the principles of the invention are equally applicable to in-flight operations as well, using geo-referenced approach and/or enroute charts such as those provided by Jeppesen. For example, the geographical feature for which an approach notification is desired could comprise an area of restricted airspace, and a notification could be provided to a pilot when the aircraft enters a containment area corresponding either to a fixed distance surrounding that airspace, a variable distance based on the amount of time which the aircraft would require to reach that airspace, or some combination thereof.

Additionally, while the embodiments of the invention describe herein relate to a monitoring system utilized in connection with an aircraft in the environment of an airport, it is to be understood that the principles of the invention could readily be applied to other vehicles and/or other environments where it would be desirable to provide a notification to the operator of a vehicle that the vehicle is approaching a particular geographical feature or area. The principles of the invention would function equally well in such other environments, provided that the system includes a database having a geo-referenced chart showing the environment in which the vehicle is operating and the specific geographical features or areas of interest, and a display unit capable of displaying the geo-referenced chart and the position of the vehicle thereon.

The foregoing description and drawings merely explain and illustrate the invention, and the invention is not so limited as those skilled in the art who have the disclosure before them will be able to make modifications and variations therein without departing from the scope of the invention.

What is claimed is:

1. A method for notifying a pilot of an aircraft that the aircraft is approaching a geographical feature of interest, the method comprising:
   retrieving geo-referenced airport chart data and containment area data from a database;
   displaying the geo-referenced airport chart on a display unit;
   determining the position and velocity of the aircraft;
   transmitting data corresponding to the position and velocity of the aircraft to a processor;
   altering a size of the containment area in response to the velocity of the aircraft;
   displaying visual indicia corresponding to the position-of the aircraft overlaid on the geo-referenced airport chart;
   determining whether the aircraft has entered the containment area;
   upon determining that the aircraft has entered the containment area, providing a visible notification to the pilot;
   comparing the airport chart display and aircraft display with the airport chart data and aircraft position data; and
   providing a notification to the pilot in the event that a display error is detected.

2. A method for notifying an operator of a vehicle that the vehicle is approaching a geographical feature of interest, the method comprising:
   retrieving geo-referenced chart data and containment area data from a database;
   displaying the geo-referenced chart on a display unit;
   determining the position and velocity of the vehicle;
   transmitting data corresponding to the position; and velocity of the vehicle to a processor;
   altering a size of the containment area in response to the velocity of the aircraft;
   displaying visual indicia corresponding the position of the vehicle overlaid on the geo-referenced chart;
   determining whether the vehicle has entered the containment area;
   upon determining that the vehicle has entered the containment area, providing a visible notification to the operator;
   comparing the chart display and vehicle display with the chart data and vehicle position data; and
   providing a notification to the operator in the event that a display error is detected.

* * * * *